US005945918A

United States Patent [19]

McGonigal et al.

[11] Patent Number: 5,945,918

[45] Date of Patent: Aug. 31, 1999

[54] APPARATUS AND METHOD FOR LOCATING A REMOTE CONTROL UNIT

[75] Inventors: Mark G. McGonigal, 545 Hollybrook Rd., Absecon, N.J. 08201; Adelbert M. Gillen, Warminster, Pa.

[73] Assignee: Mark G. McGonigal, Absecon, N.J.

[21] Appl. No.: 08/361,163

[22] Filed: Dec. 21, 1994

Related U.S. Application Data

[63] Continuation of application No. 07/889,426, May 28, 1992, abandoned, which is a continuation-in-part of application No. 07/628,623, Dec. 19, 1990, abandoned.

[51] Int. Cl.[6] .......... H04Q 9/00

[52] U.S. Cl. .......... 340/825.36

[58] Field of Search .......... 340/825.36, 539, 340/572, 825.49, 825.72, 825.44, 825.69; 455/38.2, 38.3, 343, 228

[56] References Cited

U.S. PATENT DOCUMENTS

| | | | |
|---|---|---|---|
| 4,028,688 | 6/1977 | Goleman | 340/539 |
| 4,101,873 | 7/1978 | Anderson et al. . | |
| 4,101,886 | 7/1978 | Grimes | 340/539 |
| 4,386,371 | 5/1983 | George . | |
| 4,476,469 | 10/1984 | Lander . | |
| 4,507,653 | 3/1985 | Bayer . | |
| 4,591,835 | 5/1986 | Sharp . | |
| 4,598,272 | 7/1986 | Cox . | |
| 5,049,884 | 9/1991 | Jaeger et al. | 455/228 |
| 5,144,294 | 9/1992 | Alonzi et al. | 340/825.49 |
| 5,294,915 | 3/1994 | Owen | 340/825.49 |

FOREIGN PATENT DOCUMENTS

| | | | |
|---|---|---|---|
| 0089667 | 9/1983 | European Pat. Off. | 340/539 |
| 58-153484 | 9/1983 | Japan | 340/825.72 |
| 61-289736 | 12/1986 | Japan | 340/825.49 |
| 63-172985 | 7/1988 | Japan | 340/825.49 |
| 63-314994 | 12/1988 | Japan | 340/825.72 |
| 1171396 | 7/1989 | Japan | 340/825.49 |
| 9117634 | 11/1991 | WIPO | 340/825.49 |

*Primary Examiner*—Sandra O'Shea
*Attorney, Agent, or Firm*—Allan Jacobson

[57] ABSTRACT

This invention enables a user to locate a missing remote control unit for an appliance, such as a television set, by causing the missing unit to emit an alarm. The television set includes a transmitter which is controlled by a switch mounted on the television cabinet. The remote control unit includes a receiver, capable of detecting a signal from the transmitter. The receiver activates an alarm, which can be audible, visible, or both. When the switch is depressed, and if the remote control unit is within range, the alarm will be activated, and the unit is easily located. The transmitter can be controlled by a timer which governs the period during which the alarm sounds. Also, the transmitter can be connected to a lamp, or other indicator, to show the user when the transmitter is operating. The transmitter and switch can be built into the television cabinet, or they can be housed in a separate unit which is attached to the cabinet. The remote control unit is powered by a battery, and includes a device for sensing when the battery current is low, and for activating the alarm when that condition occurs. In another embodiment, the circuit automatically switches the battery on and off, the battery delivering current only for a fraction of the operating time, thus prolonging the interval between required battery replacements.

15 Claims, 3 Drawing Sheets

APPARATUS AND METHOD FOR LOCATING A REMOTE CONTROL UNIT

CROSS-REFERENCE TO PRIOR APPLICATION

This is a continuation of application Ser. No. 07/889,426, filed May 28, 1992, abandoned, which is a continuation in part of U.S. patent application Ser. No. 07/628,623, filed Dec. 19, 1990, abandoned.

BACKGROUND OF THE INVENTION

This invention includes a method and apparatus for finding a missing remote control unit, especially a unit which controls a television (TV) set or video-cassette recorder (VCR).

It is known to use remote control units to control the operations of electronic appliances such as TV sets and VCRs. Such remote control units are typically wireless, and operate by generating electromagnetic or acoustic waves which are detected by a receiver located inside the appliance. Remote control units are usually designed to be hand-held, and therefore are relatively small. Because of their small size, these units are easily lost or misplaced. A remote control unit for a TV set is often lost in the cushions of a sofa, or under the sheets or blankets of a bed. The unit can also be inadvertently carried away from the site of the TV set.

The problem of locating a missing remote control unit for a television receiver was recognized in U.S. Pat. No. 4,386,371. The solution proposed in the latter patent is to connect the remote control unit to the TV set by a wire. While this approach does solve the problem of locating the remote control unit, it is inconvenient to maintain a wire connection between the remote control unit and the TV set.

It has been known to locate a missing object by using a radio signal to activate an alarm device placed on the object. For example, U.S. Pat. No. 4,101,873 shows a device for locating missing articles, such as eyeglasses or purses. A small transmitter is worn by the user, and a small receiver is attached to the object to be located. The receiver is connected to actuate an alarm. When the transmitter is activated, its signal is detected by the receiver, and the alarm is sounded, giving the user an indication of the location of the object.

U.S. Pat. No. 4,476,469 shows a hand-held device which houses a transmitter, and which causes a receiver, placed on the object to be located, to sound an alarm.

Other patents which describe systems for sounding an alarm to locate missing articles include U.S. Pat. Nos. 4,507,653, 4,598,272, and 4,591,835. All of the above-cited patents are hereby incorporated by reference into this disclosure.

The most pertinent item of the prior art is Japanese Patent Publication No. 63-314994. The latter reference shows a remote control device which receives a signal sent by a transmitter located in the housing of an appliance. Upon detection of the signal, the remote control device sounds an audible alarm.

Although the problem of locating missing articles has been addressed in the prior art, practical problems remain. For example, prolonged operation of the receiver in the remote control unit drains the battery relatively quickly. To assure reliable operation, one must have confidence that the battery powering the receiver will continue to work for a long time. Otherwise, when the remote control device is lost, there will be no easy way of finding it. Also, the remote control devices of the prior art give no indication of how close the user is; merely sounding an alarm may not be enough to tell the user the location of the missing unit. The present invention addresses this and other problems, by providing a convenient and economical improvement over the devices of the prior art.

SUMMARY OF THE INVENTION

The present invention is used with a television set or other appliance which is operated by a wireless remote control unit. A transmitter is mounted on the TV set, preferably inside the cabinet which houses the set. A switch is also mounted on the cabinet, and is connected to operate the transmitter. A receiver, capable of detecting a signal from the transmitter, is built into the remote control unit. The receiver is also connected to an alarm device, such as a buzzer, a lamp, or both. When the switch on the TV set is actuated, the transmitter emits a signal. If the remote control unit is within range, the receiver will detect the signal and activate the alarm.

The transmitter is preferably controlled by a timer which causes the signal to be emitted only during a predetermined period of time. Also, the transmitter can be connected to an indicator lamp, or equivalent device, for showing the user that the transmitter is currently emitting a signal. Thus, if the remote control unit is not located, the user will know whether the failure to hear or see an alarm is due to the lack of a signal from the transmitter, or whether it is due to some other cause. Also, the receiver can be equipped with a circuit which senses when the battery current falls below a predetermined level, and which activates the alarm to notify the user of this condition.

In another embodiment, the receiver includes a circuit which switches the battery power to the receiver on and off repeatedly, so that the receiver operates for only a small fraction of the time. This circuit therefore substantially increases the effective life of the battery.

In another embodiment, the receiver includes means for varying the loudness of the alarm signal in response to the strength of the signal received from the transmitter. For example, the loudness of the alarm signal can be varied according to the automatic gain control voltage which appears at the receiver. Thus, the loudness of the alarm gives an indication of the distance of the remote control unit from the appliance.

It is therefore an object of the present invention to provide a method and apparatus for locating a missing remote control unit for an appliance.

It is another object to provide an apparatus for locating a remote control unit for an appliance, wherein the apparatus is built into the same cabinet which houses the appliance.

It is another object to provide an apparatus as described above, wherein an alarm device is built into the remote control unit.

It is another object to provide an apparatus for locating a missing remote control unit for a TV set, wherein the apparatus itself is not likely to become lost.

It is another object to provide an apparatus for locating a missing remote control unit, wherein the apparatus provides an indication of when a signal is being transmitted to a receiver in the remote control unit.

It is another object to prolong the effective life of the battery which powers the circuitry of a remote control of the type described above.

It is another object to provide an apparatus as described above, wherein the loudness of an alarm signal varies with the strength of a signal received from the transmitter.

Other objects and advantages of the present invention will be apparent to those skilled in the art, from a reading of the following brief description of the drawings, the detailed description of the invention, and the appended claims.

DETAILED DESCRIPTION OF THE INVENTION

The present invention is used to locate a missing remote control unit for an appliance, especially a television (TV) set or a video-cassette recorder. The invention is not limited to use with these appliances, however. In this specification, whenever the terms "TV" or "television" are used, it is understood that other appliances could be substituted.

Figure 1:
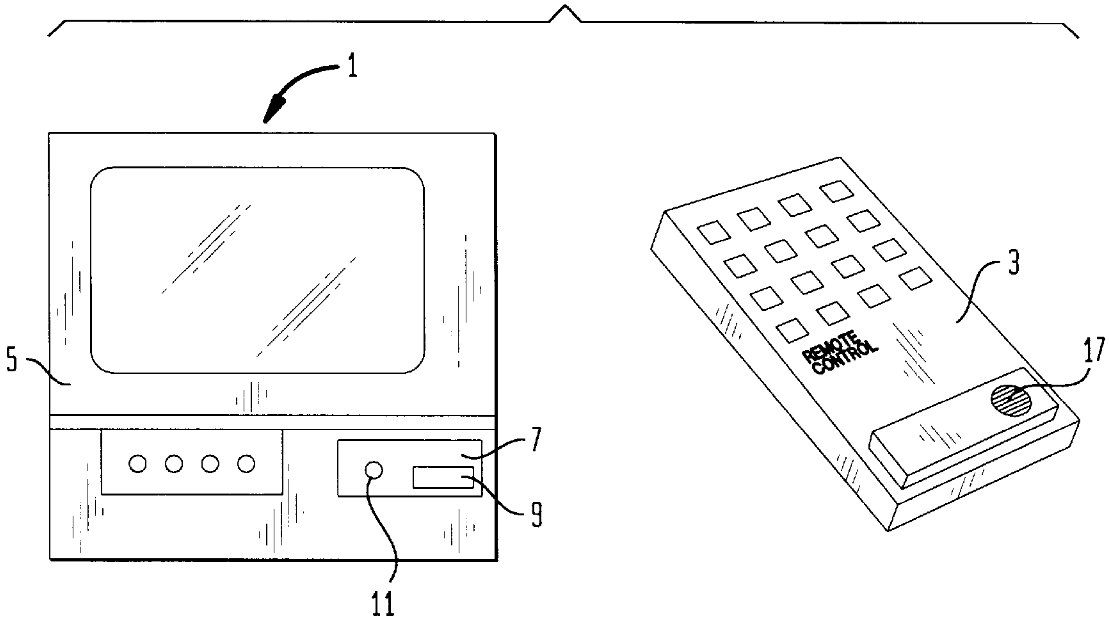
FIG. 1 is a diagram showing a television set which is equipped with a transmitter, according to the present invention, and a separate remote control unit which includes an alarm activated by a signal from the transmitter.

FIG. 1 shows the basic arrangement of one embodiment of the present invention. A television (TV) set 1 is assumed to contain all the necessary circuitry for interacting with remote control unit 3. For purposes of clarity of illustration, the television set and remote control unit are not drawn to the same scale in FIG. 1. The particular circuitry of the TV set and the remote control unit are entirely conventional, and do not form a part of the present invention. The TV set is housed within cabinet 5. Mounted within the cabinet is a transmitter, the outer panel of which is indicated by reference numeral 7. The transmitter is controlled by switch 9, which can be a pushbutton switch, or any other kind of switch. The panel may also include lamp 11 which is activated by the transmitter, as will be described below.

Remote control unit 3 includes a receiver (not shown in FIG. 1), the receiver being mounted within the housing of remote control unit 3. The receiver is capable of detecting a signal emitted by the transmitter. The receiver is connected to an audible alarm which is sounded through speaker 17. Alternatively, or in addition to the audible alarm, the receiver may be connected to a lamp (not shown in FIG. 1), for providing a visual indication of the detection of a signal from the transmitter.

The circuits for the transmitter and receiver are entirely conventional. The circuits shown in the above-cited patents, or other circuits, could be used. The invention should not be deemed limited to any particular circuit design.

The transmitter is preferably connected to the same power source which powers the circuits of the TV set. The receiver obtains its power from the same source that powers the remote control unit, i.e. a battery or equivalent. The receiver is tuned to detect a signal having the frequency of the transmitter.

Figure 2:
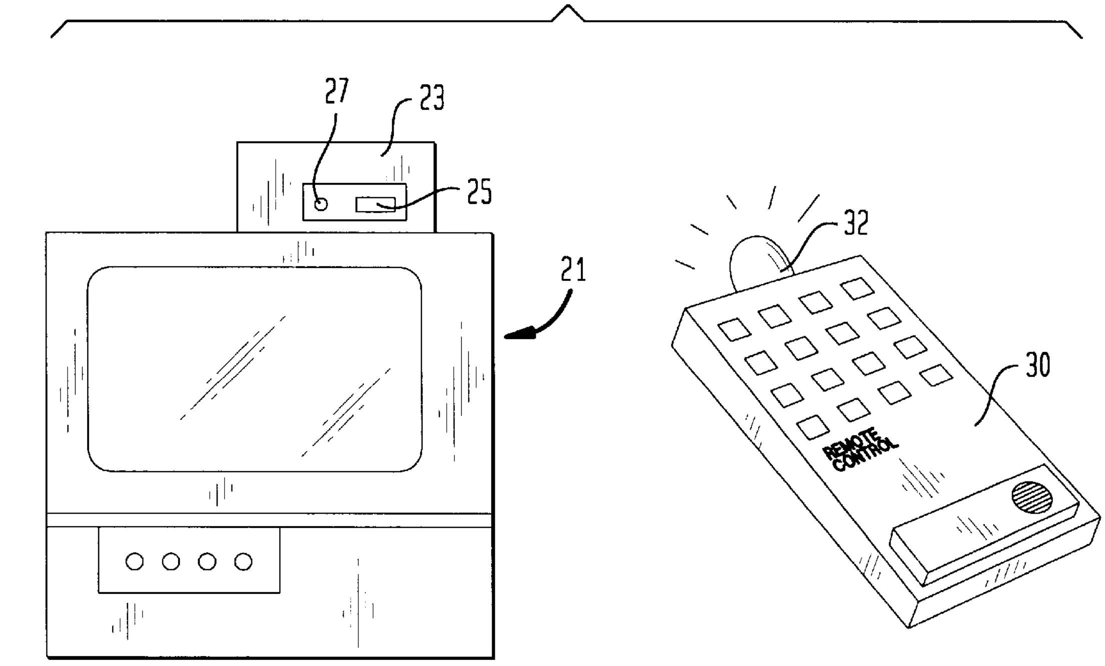
FIG. 2 is a diagram, similar to FIG. 1, but showing the transmitter unit separate from the television set, and mounted thereto.

FIG. 2 is a diagram, similar to FIG. 1, of another embodiment of the invention, wherein the transmitter and switch are contained within a separate unit. In FIG. 2, transmitter unit 23 rests on TV set 21 (or is mechanically affixed thereto). The transmitter unit includes switch 25 and lamp 27. Remote control unit 30 is similar to unit 3 of FIG. 1, except that it has a lamp 32. This lamp could also have been provided in FIG. 1. The lamp could also have been omitted in FIG. 2.

The arrangement of FIG. 2 makes it possible to adapt existing appliances for use with the present invention. Because the transmitter, timer, and lamp are all located within the same housing, this housing can be conveniently affixed to the cabinet of an existing TV set, or can be simply laid on top of the cabinet. The transmitter can be connected to the TV power supply, or it can include its own power supply, and can be separately plugged into a standard wall outlet. Similarly, a small receiver and alarm can be attached to the existing remote control unit. Of course, in all cases, the frequencies of the transmitter and receiver must be matched.

Figure 3:
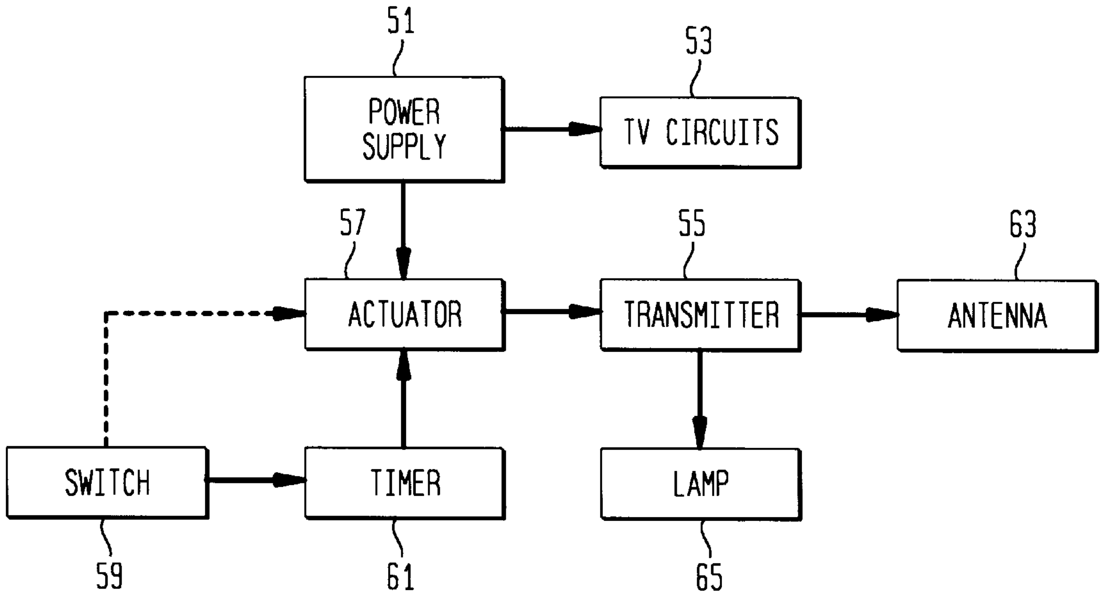
FIG. 3 is a block diagram showing the major components of the "transmitting end" of the apparatus, i.e. those components located in or near the television set.

FIG. 3 is a block diagram showing the major components of the transmitter portion of the apparatus of the present invention. FIG. 3 applies to the transmitter of either FIG. 1 or FIG. 2. Power supply 51 powers the TV circuits 53, in a conventional manner. Transmitter 55 is coupled to the same power supply 51, through actuator 57. The actuator can be a relay which is controlled manually, by switch 59, or electrically, by timer 61. In either case, the actuator connects the power supply to the transmitter, so that the transmitter emits a signal. The output of the transmitter is connected to a suitable antenna 63. The transmitter may also be connected to lamp 65. Lamp 65 is illuminated only when the transmitter is emitting a signal. Lamp 65 is thus the same component which is symbolically represented by reference numerals 11 and 27 in FIGS. 1 and 2.

Figure 4:
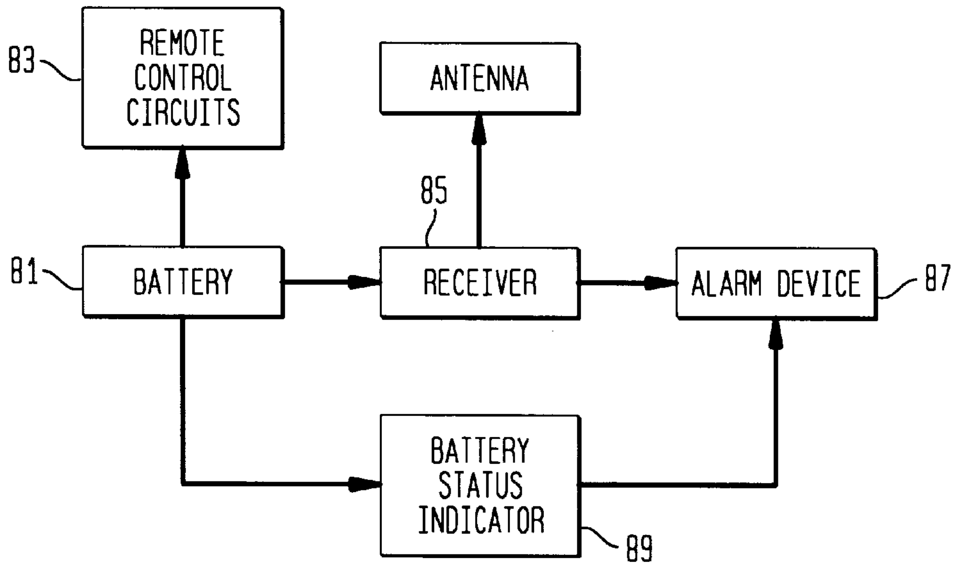
FIG. 4 is a block diagram showing the major components of the "receiving end" of the apparatus, i.e. those components located on or inside the remote control unit.

FIG. 4 is a block diagram of the major components of the remote control portion of the apparatus. Remote control circuits 83 are conventional, and are powered by battery 81. Receiver 85 is connected to the same power supply, and is capable of receiving the signal emitted by the transmitter. The receiver has an antenna, as shown in FIG. 4. The output of the receiver is connected to an alarm device 87. The alarm device can be a buzzer or other audible alarm, a light, or a combination of both.

Battery status indicator 89 is a circuit which is powered by battery 81, and which generates a signal when the battery current falls below a predetermined threshold. Such circuitry is conventional, and commercially available; the details of the circuitry are not part of the present invention. Battery status indicator 89 is connected to alarm device 87. Thus, the same alarm is activated by both the receiver 85 and the indicator 89, and it is not necessary to provide separate alarm devices.

The operation of the invention can now be described. Suppose first that the timer is not present, and that the transmitter is operated directly by the switch. When the user desires to locate the remote control unit, the user presses the switch 9 on the TV set (or other appliance), or switch 25 on the separate transmitter unit of FIG. 2. The transmitter emits a signal immediately after the switch is actuated, but only while the switch is depressed. While the signal is being emitted, lamp 11 (or 27), if present, is illuminated to inform the user that the transmitter is operating. If the remote control unit is within range (and if its battery is operating), the receiver in the unit will detect the signal from the transmitter, and will activate the alarm. The user will hear the audible alarm and/or see the visible alarm, and can easily retrieve the remote control unit.

Now suppose that the timer is present. In this embodiment, depressing the switch causes the timer to operate the transmitter for a predetermined interval of time. Again, the transmitter begins to transmit its signal immediately after the switch is actuated by the user. But in this case, the user need not hold the switch in the depressed position; instead, the transmitter will automatically emit a signal, for a predetermined time interval, as controlled by the timer and actuator. As before, lamp 11 (or 27) signals that the transmitter is emitting a signal. Lamp 11 (or 27) is especially useful in the embodiment which includes the timer, because the lamp serves, in part, as a monitor of the setting of the timer. If no alarm from the remote control unit is heard, but the lamp is lit, the user will know that the remote control unit is probably either out of range or not working. In this case, when the lamp goes "off", the user may want to activate the transmitter again. If the alarm is heard and/or seen, the remote control unit can be retrieved, as before.

The lamp can be connected to the transmitter in different ways. For example, the lamp can be connected to indicate when power has been applied to the transmitter. Alternatively, the lamp can be actuated by the presence of an actual electromagnetic signal coming from the transmitter, without a direct connection to the transmitter. Indeed, the lamp can itself be located on a separate receiver, housed within the TV set, having no direct connection to the transmitter. The latter alternative provides the most objective indication of whether the transmitter is working.

The lamp can provide a continuous signal, or it can be activated by a flashing device (not shown). Also, other types of alarms can be used. For example, the alarm could comprise a recorded or synthesized voice, giving a message which assists the user in locating the remote control unit.

Although the transmitting portion of the apparatus of the present invention can either be built into the appliance (as shown in FIG. 1) or can be housed in a separate box (as shown in FIG. 2), the arrangement of FIG. 1 is preferred. It is also preferred to place the receiver inside the housing of the remote control unit. It is also desirable to place the alarm (if it is audible) inside the remote control unit, so as not to increase the size of the unit unduly. As shown in FIGS. 1 and 2, a grille or baffle can be included to allow the sound from the alarm to penetrate the unit housing. If a visible alarm is used, such as a lamp, it is necessary to mount such alarm so that it will be seen from the outside. The alarm could therefore be mounted on the outside of the housing. It is also possible to make one or more of the buttons on the remote control unit from a transparent or translucent material, and to provide an alarm lamp within such button.

In the preferred embodiment, the transmitter should operate regardless of whether the TV is "on" or "off". A remote control unit can be lost even when the TV set is not being used. Thus, the power to the transmitter (and the timer and lamp, if present) should not be deactivated simply because the main power switch of the TV set is turned "off". Instead, the transmitter should be connected to the TV power supply in such a manner that the transmitter receives power whenever the TV set is plugged into the wall outlet. Of course, the same can be accomplished in the embodiment of FIG. 2. In the latter case, the transmitter can be connected to a source of power on the TV chassis, or it can be separately plugged into a wall outlet. The receiver, being powered by a battery, will always operate, provided that the battery is working.

The transmitter should generate a signal having a range which preferably includes all points within an average house. The signal from the transmitter should be able to penetrate partition walls and ceilings, so that the remote control unit can be detected if it has been carried into another room or to another level of a house. However, the range should ordinarily not be too great, to avoid interference with similar transmitter/receiver pairs used by neighbors. The range of the transmitter can be determined by its power level and the configuration of its antenna, as is well known in the art. The effective range of the signal emitted by the transmitter is also determined, in part, by the sensitivity and antenna configuration of the receiver.

In congested urban areas, it is likely that a transmitter in one home may be physically close to a remote control unit in a neighboring home. Thus, even if the transmitter has a short range, activation of the transmitter in one home may cause activation of an alarm in the neighboring home. This problem can be reduced or eliminated by designing transmitter and receiver pairs to operate at varying frequencies, so that a given pair is not, in general, using the same frequency as the pair of units in the neighboring home. Moreover, if the frequencies of the transmitters in adjacent houses are different, then it is possible to design the transmitters to have greater ranges. An increased range is useful when a remote control unit is inadvertently carried to a neighbor's house, or when the unit is otherwise carried outside.

Figure 5:
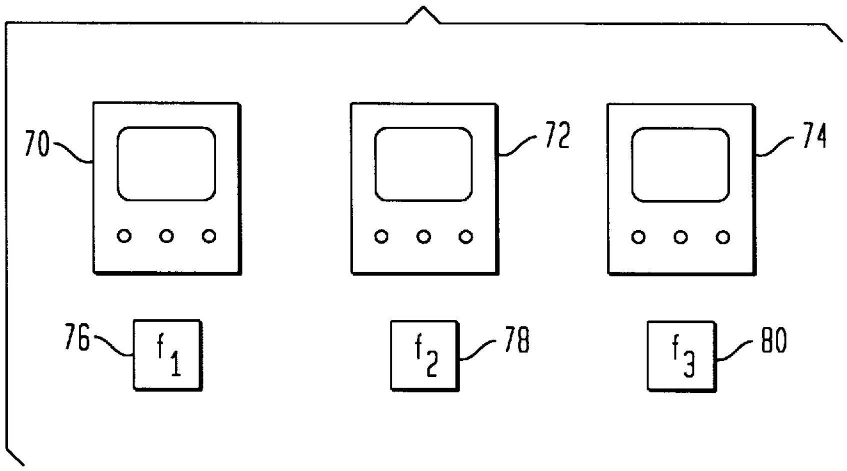
FIG. 5 is a diagram illustrating the embodiment wherein there are several appliances and several remote control units, each appliance and remote control unit pair being tuned to a different frequency.

FIG. 5 symbolically illustrates the latter embodiment, wherein there are multiple transmitter and appliance pairs within a small area. In FIG. 5, appliances 70, 72, and 74 (shown symbolically as television sets, although other appliances could be substituted) are paired with remote control units 76, 78, and 80, respectively. The receivers in units 76, 78, and 80 operate at frequencies $F_1$, $F_2$, and $F_3$ respectively, and the associated appliances have transmitters operating at the same respective frequencies. Thus, the transmitter in a given appliance will activate only one of the remote control devices. The remote control units and appliances shown in FIG. 5 are assumed to be spread over a relatively small area. By "small" it is meant that all of the receivers in the remote control units are within the range of the transmitters in the appliances. Thus, the size of the area depends on the power of the transmitters, and on the efficiency of the antennas. For low-powered transmitters, it is expected that the area of concern will be the area within a radius of a few hundred feet or less from each transmitter.

Figure 6:
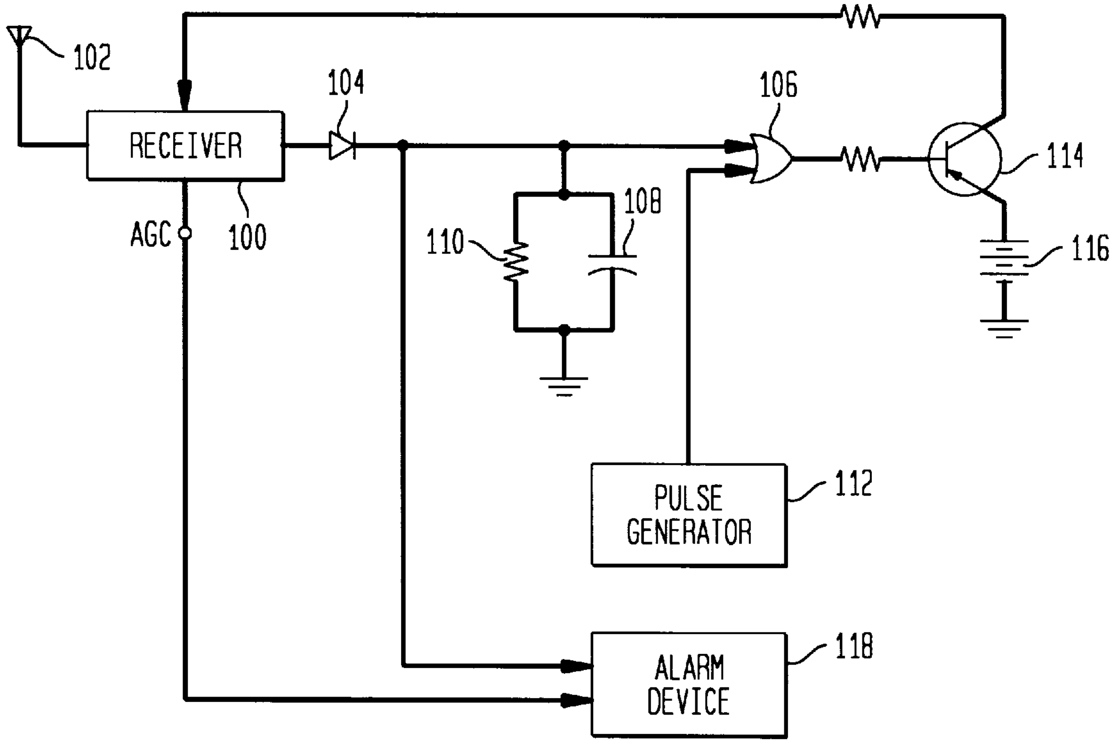
FIG. 6 is a schematic and block diagram showing alternative circuitry for the receiver, the figure showing a means for conserving battery power and for varying the loudness of an alarm signal in response to changes in a received signal from the transmitter.

FIG. 6 illustrates two further embodiments of the present invention. FIG. 6 provides a block and schematic diagram of the receiver and alarm circuitry, located in the remote control unit, as discussed above. Receiver 100 is connected to antenna 102, and provides an output signal which is rectified by diode 104. It is assumed that the receiver contains the necessary circuitry to convert an incoming rf signal to an audio-frequency signal; such circuitry is commercially available, and does not form part of the present invention. The output of diode 104 is then connected to one of the inputs of OR gate 106. An R-C circuit, formed by capacitor 108 and resistor 110 serves as a peak detection circuit. By an appropriate choice of the time constant of the R-C circuit, one insures that the peak level of the rectified output of the receiver will appear at one of the inputs of OR gate 106 for a predetermined interval of time.

The other input to OR gate 106 comes from pulse generator 112. The pulse generator, also a commercially available unit, produces a train of pulses. Preferably the pulses have narrow widths, in the sense that within each period of about 3–4 seconds, the pulse is "high" for only about 50 msec. The latter figure is only an example; many other pulse profiles will yield acceptable results.

The output of OR gate 106 will thus be "high" either if a signal is detected by the receiver or a pulse is received from the pulse generator. Moreover, if a signal is detected by the receiver, the R-C circuit will hold the output of OR gate 106 high for a period of time. The output of the OR gate is applied to the base of transistor 114 through resistor 120. When the output of the OR gate is "high", the transistor conducts,1and thus connects battery 116 through resistor 122 to the receiver (and to all other parts of the system except the pulse generator). When the output of the OR gate is low, the transistor does not conduct, and the battery is effectively disconnected from the circuit.

The pulse generator itself is preferably made of CMOS circuitry, which requires very little current. The battery 124 which powers the pulse generator produces only a few microamperes of current, and will last for a long time. Because the main power supply (battery 116) is disconnected for most of the operating cycle, the effective life of battery 116 is substantially increased. For example, if the receiver is switched off for all but 50 msec of every interval of 4 seconds, the effective battery life is increased by 4/0.050 or 80 times. Thus, battery 116, which produces a relatively high current, operates for only a fraction of an operating cycle, while battery 124 powers the pulse generator, and produces a very small current, and operates continuously.

Note that it may be necessary to invert the output of the OR gate to obtain the necessary signal polarity to control the transistor. Such modification can be made as necessary, as will be apparent to those skilled in the art.

FIG. 6 also illustrates still another modification of the circuitry of the remote control device. In this modification, the loudness (or other parameter) of the alarm is made to vary according to the strength of the signal from the transmitter. This means that the loudness of the alarm gives an indication of how far the remote control device is from the transmitter. This feature can be implemented in different ways. The preferred method is to use the automatic gain control (AGC) circuitry which generally forms part of most receiver circuits. In FIG. 6, receiver 100 contains a schematic indication of an AGC terminal. The latter terminal is connected to alarm device 118, which is also connected to the rectified output of the receiver. The AGC signal varies according to the strength of the signal detected by the receiver. The AGC signal thus can be used to control the loudness (or some other characteristic) of the alarm signal. Other means of detecting the strength of the transmitter signal can also be used.

Note also that the two additional features illustrated in FIG. 6, namely the intermittent switching of the power supply and the variation in loudness of the alarm, need not both be present. One or the other or both of the latter features can be used, and the invention includes all such cases.

Many remote control devices available commercially have been designed to control both a TV set and a VCR. To maximize the benefit of the invention, it is preferred that both the TV set and VCR have a transmitter, and associated components, as described above. Both transmitters should be tuned to the frequency of the receiver in the remote control unit. Activation of either transmitter will cause activation of the alarm in the remote control unit. Thus, if the TV set and VCR are separated (for example, if the VCR is to be connected to a different TV set), it is still possible to use the transmitter in either appliance to locate the remote control unit.

According to the present invention, the transmitter is permanently located on or inside the TV set or other appliance. Thus, the transmitter itself is not likely to become lost. The user always knows to locate the missing remote control unit by depressing a switch on the TV set.

Although the invention has been described with respect to specific embodiments, it is understood that many variations are possible. For example, instead of using a timer to control the transmitter, it is possible to use a timer to control the receiver. In this case, the transmitter emits a short signal, of predetermined duration, and the receiver emits an alarm for a predetermined interval, as controlled by its timer.

The particular circuits used for the transmitter and receiver can be varied considerably. Certain features described above, such as the timer, and the lamp which indicates that the transmitter is operating, can be omitted. These components can be built into the TV set or housed separately. The lamps 11 or 27 could alternatively be combined with switches 9 or 25; that is, the lamp could be positioned to illuminate the button when the transmitter is operating. These and other similar modifications are intended to be included within the spirit and scope of the following claims.

What is claimed is:

1. In an appliance having a wireless remote control device, the remote control device being capable of controlling the appliance, the appliance having a source of power, the remote control device having a separate source of power, the appliance including a transmitter, the transmitter being actuated by a switch, the transmitter being capable of emitting a signal, the remote control device including a receiver capable of receiving the signal emitted by the transmitter, the receiver being connected to an alarm device, wherein the alarm device generates an alarm when the switch is actuated, the improvement wherein the receiver has a power source, and wherein the remote control device includes means for intermittently connecting the power source to the receiver, the intermittent connecting means comprising:

a pulse generator operated continuously by an auxiliary power source independent of the power source of the receiver, the pulse generator having an output connected to a first input of an OR gate, the receiver having an output connected to a second input of the OR gate, an R-C circuit connected to the output of the receiver and to the second input of the OR gate, the output of the OR gate being connected to an electronic switch which comprises means for connecting the power source of the receiver to the receiver.

2. The improvement of claim 1, wherein the connecting means also includes second means for connecting the power source to the receiver when the receiver detects a signal from the transmitter.

3. The improvement of claim 2, wherein said second means comprises means for maintaining power to the receiver for a predetermined time interval after the receiver detects a signal from the transmitter.

4. The improvement of claim 2, further comprising means for varying a characteristic of an alarm produced by the alarm device, in response to the strength of a signal detected by the receiver.

5. The improvement of claim 4, wherein the receiver includes an automatic gain control circuit, and wherein the automatic gain control circuit generates a signal which is connected to the alarm device.

6. The improvement of claim 1, wherein the auxiliary power source produces a current which is smaller than a current produced by the receiver power source.

7. The improvement of claim 1, wherein the electronic switch comprises a transistor having an emitter, a base, and a collector, and wherein the output of the OR gate is connected to the base of the transistor, wherein the receiver power source is connected to the emitter, and wherein the collector is connected to the receiver.

8. In an appliance having a wireless remote control device, the remote control device being capable of controlling the appliance, the appliance having a source of power, the remote control device having a separate source of power, the appliance including a transmitter, the transmitter being actuated by a switch, the transmitter being capable of emitting a signal, the remote control device including a receiver capable of receiving the signal emitted by the transmitter, the receiver being connected to an alarm device, wherein the alarm device generates an alarm when the switch is actuated, the improvement wherein:

- the receiver has a first power source,
- the receiver has an output which is connected to an R-C circuit and to a first input of an OR gate, the output of the receiver also being connected to the alarm device,
- a pulse generator is connected to a second input of the OR gate, and
- the OR gate has an output connected to an electronic switch which, when closed, connects the first power source to the receiver.

9. The improvement of claim 8, wherein the pulse generator produces pulses having widths sufficiently narrow that the pulses are "high" only for a small fraction of a given interval of time.

10. The improvement of claim 8, wherein the pulse generator is powered by a second power source which is separate from the first power source, and wherein the current supplied by the second power source is less than a current supplied by the first power source.

11. In an appliance having a wireless remote control device, the remote control device being capable of controlling the appliance, the appliance having a source of power, the remote control device having a separate source of power, the appliance including a transmitter, the transmitter being actuated by a switch, the transmitter being capable of emitting a signal, the remote control device including a receiver capable of receiving the signal emitted by the transmitter, the receiver being connected to an alarm device, wherein the alarm device generates an alarm when the switch is actuated, the improvement wherein:

- the receiver has a power source,
- the receiver has an output which is connected to a first input of an OR gate, the output of the receiver also being connected to the alarm device,
- a pulse generator is connected to a second input of the OR gate, and
- the OR gate has an output connected to an electronic switch which, when closed, connects the power source to the receiver.

12. A method of providing power to a receiver attached to a remote control unit, the receiver comprising means for activating an alarm when the receiver detects a signal from a transmitter located on an appliance capable of being controlled by the remote control unit, the method comprising the steps of:

- repeatedly connecting and disconnecting a power source to the receiver by turning an electronic switch on and off in accordance with a train of pulses,
- overriding a signal from said pulses when the receiver is detecting a signal, so as to keep the receiver "on" when a signal is detected, and
- maintaining the connection between the power source and the receiver for a predetermined interval of time following the detection of a signal by the receiver.

13. The method of claim 12, wherein the pulses are produced by a pulse generator which is powered by an auxiliary source independent of the receiver power source.

14. The method of claim 12, wherein the overriding step is performed by applying the output of the receiver to an OR gate which controls the electronic switch.

15. The method of claim 12, wherein the maintaining step comprises the step of storing the output of the receiver in an R-C circuit, wherein the output of the receiver is connected to an OR gate which controls the electronic switch, wherein the electronic switch is actuated for an interval of time determined by the R-C circuit.

* * * * *